United States Patent
Kimura et al.

(10) Patent No.: US 7,129,672 B2
(45) Date of Patent: Oct. 31, 2006

(54) CONTROLLER APPARATUS FOR SYNCHRONOUS MOTOR AND CONTROLLING METHOD THEREOF

(75) Inventors: Yoshinori Kimura, Kawaguchi (JP); Nobuo Arakawa, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 11/226,280

(22) Filed: Sep. 15, 2005

(65) Prior Publication Data

US 2006/0006828 A1    Jan. 12, 2006

(51) Int. Cl.
*H02P 1/46* (2006.01)

(52) U.S. Cl. .............. 318/716; 318/727; 318/722; 318/809; 318/811; 318/798

(58) Field of Classification Search ........ 318/716, 318/722, 723, 809, 802, 811, 715, 717, 711, 318/778, 798, 727; 310/156, 216
See application file for complete search history.

(56) References Cited

U.S. PATENT DOCUMENTS 5,191,256 A * 3/1993 Reiter et al. ......... 310/156.49

2002/0043954 A1 * 4/2002 Hallidy ................. 318/727

FOREIGN PATENT DOCUMENTS

JP  64-14775  1/1989

* cited by examiner

*Primary Examiner*—Karen Masih
(74) *Attorney, Agent, or Firm*—Antonelli, Terry, Stout and Kraus, LLP.

(57) ABSTRACT

For providing a controller apparatus for a synchronous motor and a controlling method thereof, enabling to be manufactured, easily and cheaply, and to obtain a lock mechanism, but without necessity of mechanisms, such as, an electromotive lock mechanism, wherein the controller apparatus for the synchronous motor, which has a stator 20 wound with AC windings 21U, 21V and 21W, and a rotor 30 installed within an inside of the stator, rotatably, therein, comprises an inverter 200 for supplying AC voltages having a predetermined voltage/frequency characteristic to the AC windings, which are wound around poles of the stator of the synchronous motor; and further, the inverter is so controlled that the AC voltages, being supplied from the inverter to the AC windings wound around the poles of the stator is changed into DC voltages to be supplied thereto, when rotation of said rotor is zero (0) and also when a lock function signal is ON in condition thereof, thereby obtaining a lock condition of holding a rotating position of the rotor to the stator.

6 Claims, 6 Drawing Sheets

CONTROLLER APPARATUS FOR SYNCHRONOUS MOTOR AND CONTROLLING METHOD THEREOF

BACKGROUND OF THE INVENTION

The present invention relates to a controller apparatus for a synchronous motor having a rotor, which is rotatably inserted within an inside of a stator wound with AC windings therein, as well as, a controlling method thereof, and in particular, it relates to the controller apparatus for fixing or locking the rotor when the synchronous motor is stopped, as well as, the controlling method thereof.

Conventionally, in case when driving a load, rotationally, such as, a pump, a fan or the like, for example, the frequency of the power source is changed through frequency conversion with using a frequency converter (so called, an inverter), thereby achieving the driving of the motor at a desired frequency thereof, as is already known in the following Patent Document 1, in particular, for rotationally driving the load, i.e., a refrigerator of a cryopump, etc., for example, at a predetermined rotation speed, with using a cryopump operating apparatus, which is built up with a driving apparatus made of a synchronous motor, while applying a commercial electric power source of 50 Hz therein.

On the other hand, as a synchronous motor for use of general-purposes, being a kind of an AC motor, there is already known a synchronous motor of multi-poles structure of applying a permanent magnet therein, as well as, that having a rotor constructed with windings wound around, or that having a rotor made of a permanent magnet; i.e., using the rotor, on a surface of which are formed grooves in plural numbers thereof, in the axial direction thereof, thereby forming tooth portions therearound. Further, such the rotor structure, having the tooth portions formed therearound in the structure thereof, is widely applied, for example, also in so-called a stepping motor, and in particular, due to the discovery of rear-earth magnets (i.e., neodymium, samarium/cobalt, etc.), each having a high antimagnetic force, in recent years, it comes to be applied further widely, since a higher torque can be obtain from the same construction or volume of the rotor, and therefore the rotor can be manufactured in mass-production, to be cheap relatively.

Patent Document 1: Japanese Utility-Model Publication No. Hei 1-14775 (1989).

By the way, as was mentioned above, in case when controlling voltage supplied to an induction motor and/or a synchronous motor for use of general-purposes, while applying an ordinary inverter therein, in general, it is the mainstream of adopting a control method, therein; i.e., keeping a V/F ratio (=φ) constant, for satisfying the rated load. For this reason, when stopping the synchronous motor, since the F (frequency of the supply voltage)=0, then it is common to change also the supply voltage V down to zero (0). Thus, the supply voltage to the synchronous motor goes down to zero (0) together with the frequency thereof, and therefore the rotor is not fixed in the position thereof, but can rotate freely. Then, according to the conventional art, for preventing the rotor from such the free rotation thereof, so-called a lock condition is prepared or provided therein, and with this is driven an electromotive lock mechanism, including a brake shoe therein, thereby to hold the rotor of the synchronous motor at a predetermined position.

However, in case where such the electromotive lock mechanism is provided within the synchronous motor, then the synchronous motor itself comes to be large in the sizes thereof, and it also comes to be an expensive one, due to complexity of the structures, including that lock mechanism therein.

BRIEF SUMMARY OF THE INVENTION

Then, according to the present invention, by taking the drawbacks of the conventional prior art mentioned above into the consideration, i.e., it is an object to provide a controller apparatus for the synchronous motor, being simple in the structures thereof, as well as, capable to be manufactured cheaply, since it does not need such the complex mechanism, such as, the electromotive lock mechanism, therein, and also a controlling method thereof.

And, according to the present invention, for accomplishing the object mentioned above, firstly there is provided a controller apparatus for a synchronous motor, which has a stator wound with AC windings, a rotor installed within an inside of said stator, rotatably, and a lock function for holding a rotating position of said rotor with respect to said stator, therein, comprising: an inverter for supplying AC voltages having a predetermined voltage/frequency characteristic to the AC windings, which are wound around poles of the stator of said synchronous motor; and further a controller portion for controlling said inverter, so that the AC voltages, being supplied from said inverter to the AC windings wound around the poles of the stator of said synchronous motor, is changed into DC voltages to be supplied thereto, when rotation of said rotor is zero (0) and also when a lock function signal is ON in condition thereof.

Also, according to the present invention, for accomplishing the object mentioned above, too, there is provided a controlling method for a synchronous motor, which has a stator wound with AC windings, a rotor installed within an inside of said stator, rotatably, and a lock function for holding a rotating position of said rotor with respect to said stator, therein, comprising the following steps of: supplying AC voltages having a predetermined voltage/frequency characteristic to the AC windings, which are wound around poles of the stator of said synchronous motor, by means of an inverter; and controlling said inverter, so that the AC voltages, being supplied from said inverter to the AC windings wound around the poles of the stator of said synchronous motor, is changed into DC voltages to be supplied thereto, when rotation of said rotor is zero (0) and also when a lock function signal is ON in condition thereof.

Further, according to the present invention, within the controller apparatus for a synchronous motor and the controlling method thereof, preferably, plural numbers of tooth portions are formed on an opposing surface to said rotor, in each of said poles building up said stator, and said rotor is made of a permanent magnet and also, on an opposing surface to the poles of said stator are formed plural numbers of tooth portions, at width nearly equal to that of the tooth portions of said tooth portions, which are formed in peripheral direction, and further said AC windings are wound around the poles of said stator, within said synchronous motor. Or, preferably, the DC voltages to be supplied from said inverter to the AC windings wound around the poles of the stator of said synchronous motor, when rotation of said rotor is zero (0) and also when the lock function signal is ON in condition thereof, are variable, or are determined at a value so that current flowing through said AC winding therewith comes to be equal or less than a rated current thereof. And, in particular, it is preferable that the DC voltages to be supplied from said inverter to the AC windings wound around the poles of the stator of said synchronous motor, is determined to be about 30% of a peak value of AC voltages under steady condition of said synchronous motor, or lower than that, or are kept in a predetermined patter, in the place thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, an embodiment(s) according to the present invention will be fully explained, by referring to the attached drawings.

Figure 6:
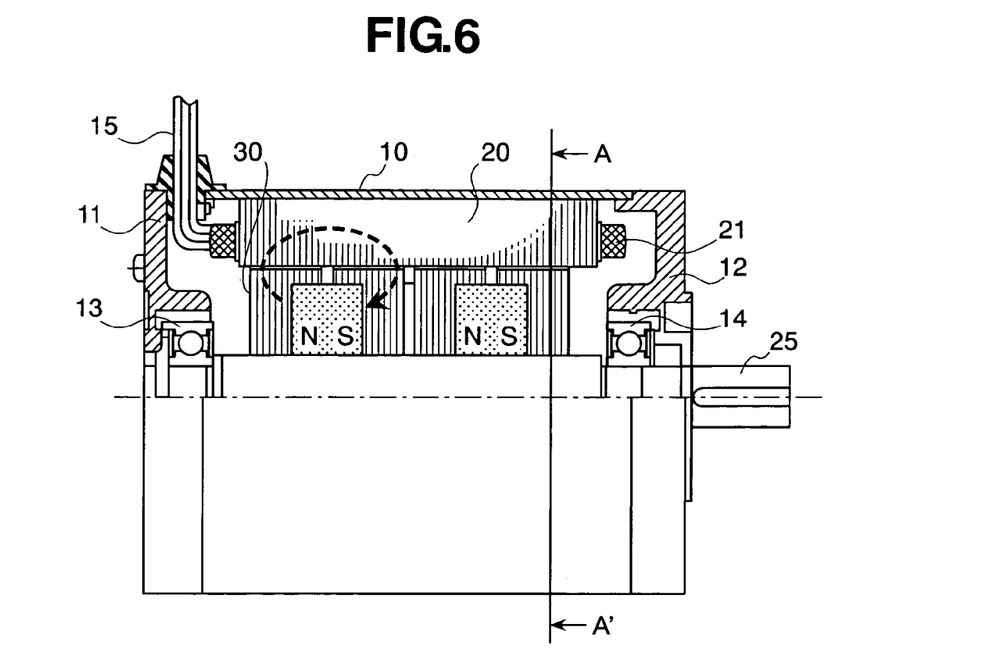
FIG. 6 is a cross-section view for showing the entire structures of the three-phases AC synchronous motor, according to an embodiment of the present invention.

First of all, in FIGS. 6 through 9(b) attached herewith are shown the entire structures of the three-phases synchronous motor, which is driven/controlled by the controller apparatus or the controlling method, according to one embodiment of the present invention, and wherein, in particular, in FIG. 6 is shown the cross-section view (the cross-section in an axial direction) of the three-phases synchronous motor mentioned above.

In those figures, a reference numeral 10 depicts a metal housing in a cylindrical shape, being made of a metal, such as, iron, for example, and within an inside thereof is installed a stator 20 piling up or laminating the layers, which are punched out into a predetermined shape from silicon steel plates, for example. Also, a reference numeral 21 in the figures depicts windings, though will be explained latter, which are wound around the periphery of plural numbers of magnetic poles formed within the stator 20. And, within a cylindrical space defined in an inside of that stator 20 is attached a rotor 30, rotatably, being cylindrically-shaped in an outer configuration thereof, through a pair of ball bearings 13 and 14 attached at a central portion of end brackets 11 and 12, which are fixed on both ends of the housing 10. Also, a reference numeral 25 depicts lead wires for supplying three-phases alternating currents to that three-phases synchronous motor.

Figure 7:
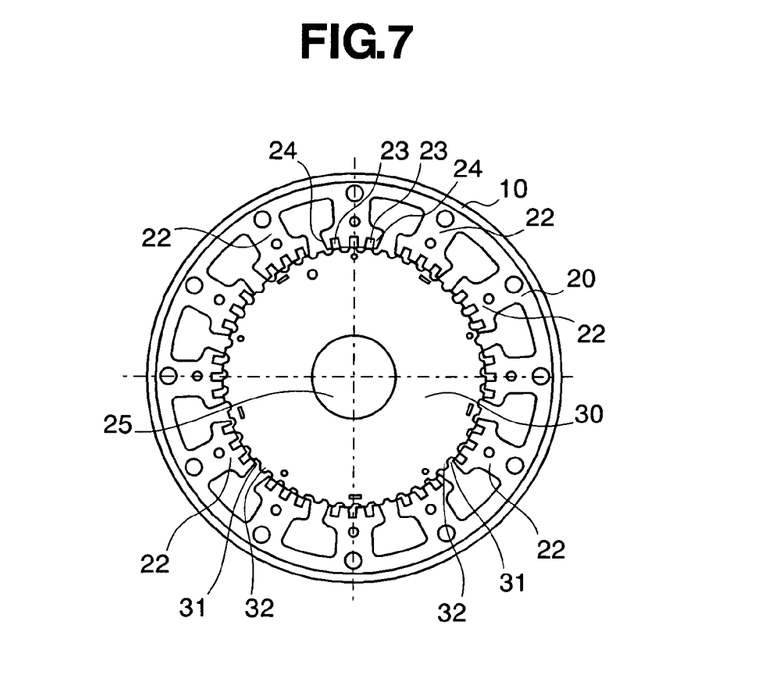
FIG. 7 is an A–A' cross-section view in FIG. 1 mentioned above, for showing the entire structures of the three-phases AC synchronous motor.
Figure 9A:
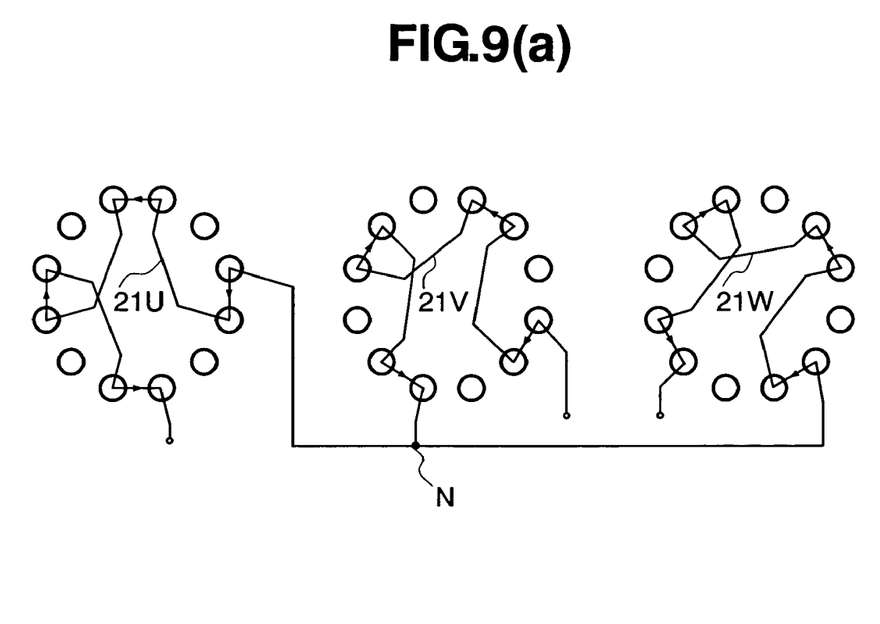
FIGS. 9(a) and 9(b) are view for showing the manner of winding three-phases AC windings within a stator of the synchronous motor, according to the present invention.
Figure 9B:
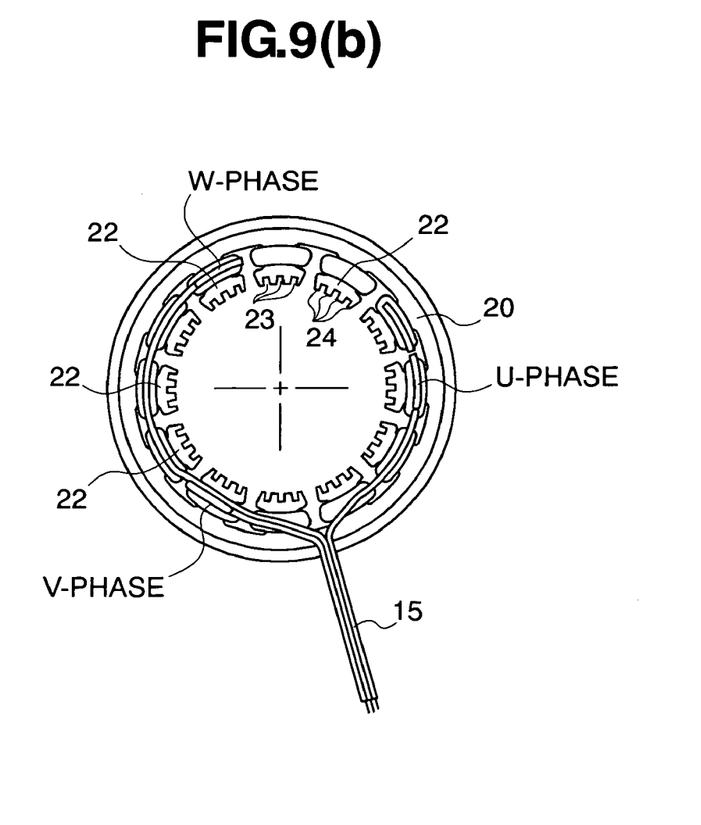

Next, in FIG. 7 attached is shown the cross-section in the portion, being cut along a line indicated by arrows A–A' in FIG. 6, within the three-phases synchronous motor. Thus, as is apparent from this cross-section view, on the stator 20 of the three-phases synchronous motor are formed twelve (12) pieces of the magnetic poles (i.e., stator poles) 22, 22 . . . , in total thereof, and around the periphery of those magnetic poles 22, 22 . . . (i.e., within the slots being formed between them) are wound up three-phases AC windings 21U, 21V and 21W, respectively, in accordance with the wire-connection method shown in FIG. 9(a) attached. Namely, in FIG. 9(a) attached is shown a circuit diagram of the three-phases AC windings, which are wound around the twelve (12) pieces of the magnetic poles 22, 22 . . . , and in FIG. 9(b) is shown the cross-section structure of the stator 20, including the windings therein. Further, a mark "N" within the figures depicts neutral points of the windings, and a reference numeral 15 depicts the lead wirings of the three phases, wherein further, a mark "U" depicts the lead wire of the U-phase, "V" the lead wire of the V-phase, and "W" the lead wire of the W-phase, respectively.

Also, as is apparent from FIG. 6 and FIG. 9(b) mentioned above, upon a surface (i.e., an opposing surface to the rotor 30) of each magnetic pole 22 of the three-phases synchronous motor, three (3) pieces of grooves 23, 23 . . . are formed, respectively, into a direction of a rotation shaft thereof; i.e., building up four (4) pieces of tooth portions 24, 24 . . . upon the surface of each of the magnetic poles, respectively.

Figure 8:
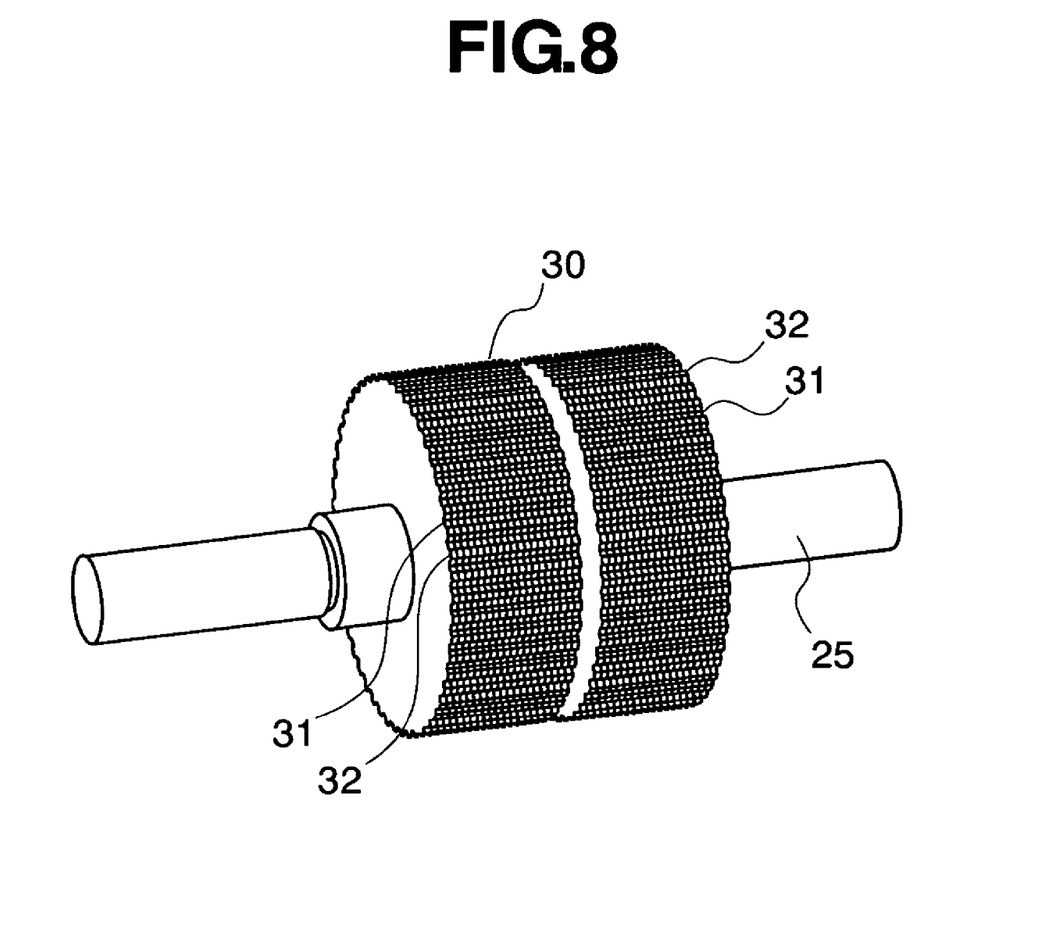
FIG. 8 is a perspective view for showing an example of the structure of a rotor of the three-phases AC synchronous motor mentioned above.

On the other hand, as is shown by an outer configuration thereof in FIG. 8 attached, the rotor 30 mentioned above is also shaped to be cylindrical in the outer configuration thereof, and on the outer peripheral surface thereof, there are also formed plural numbers of grooves 31, 31 . . . along with the direction of the rotation axis thereof; i.e., building up of tooth portions 32, 32 . . . upon an outer peripheral surface thereof. Further, this rotor 30 is that of the structure, being so-called "hybrid", and wherein, as is apparent from the cross-section view of FIG. 1 mentioned above, a cylindrical-shaped permanent magnets 33 is disposed within an inside thereof, so as to be opposite to the magnetic poles (e.g., N-pole and S-pole), in the direction of the rotation shaft, and around the periphery thereof are also piles up and fixed the layers, each of which is punched out into a predetermined shape from the silicon steel plate. By the way, the rotor 30 shown in this FIG. 8 has such the structure of attaching the silicon steel plates around one (1) piece of the permanent magnet 33, in front and rear thereof, on the other hand, the structure of the rotor 30, shown in FIG. 6 mentioned above, is one of so-called a multi-stage structure, connecting a unitary structure mentioned above into a plural number of stages, two (2) stages, for example, in the direction of the rotation shaft. However, normally, the number of stages of this rotor 30 is determined to be within a range from 1 to 4, appropriately, by taking the required output characteristics, etc., into the consideration thereof.

Namely, with the rotor 30 having such the hybrid structure, as is indicated by an arrow of broken line in FIG. 6, it is possible to build up a magnetic circuit or path, directing from the front to the rear along the direction of the rotation shaft thereof. However, in FIG. 8 mentioned above, the tooth portions 32, 32 . . . , being formed in the front and the rear on the outer periphery surface of the rotor 30, are shifted by a half (½) pitch from each other. Thus, the portion of being the tooth 32 in the front thereof is formed in a form of the groove 31 in the rear thereof. And, according to the present embodiment, the number of the tooth portions 32, 32 . . . (or, the grooves 31, 31 . . . ), which are formed on the outer periphery of the rotor 30, is about 36 to 200, approximately, in total of those formed in the front and the rear. Or, preferably if forming those tooth portions 32 (or the grooves 31) to be inclined by a very small angle; i.e., building up so-called the skew structure, then it is possible to reduce the phenomenon, i.e., cogging, and thereby obtaining a smooth output torque, in particular. Furthermore, this tooth portion 32 (or the groove 31) may be rectangular, circular or elliptical in the cross-sectional configuration thereof.

Figure 2:
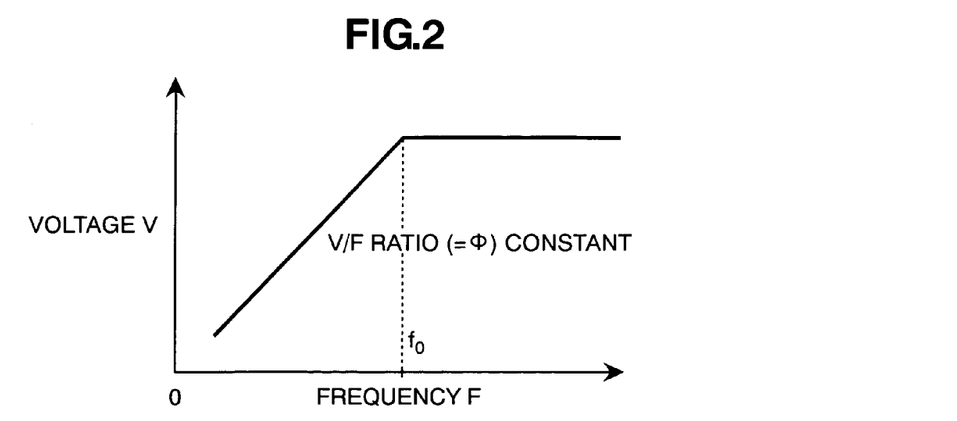
FIG. 2 is a graph for showing a characteristic curve of the controller apparatus for the synchronous motor, according to the present invention.

Further, in the relationship between the tooth portions 24, 24 . . . , which are formed on the stator 20, and the tooth portions 32, 32 . . . , which are formed on the rotor 30, as is shown in FIG. 2 mentioned above, they are formed to be about same in the sizes (i.e., pitch), respectively, and they are shifted by a half (½) pitch, with respect to a portion of ¼ round (90 degree) on the periphery thereof.

Figure 1:
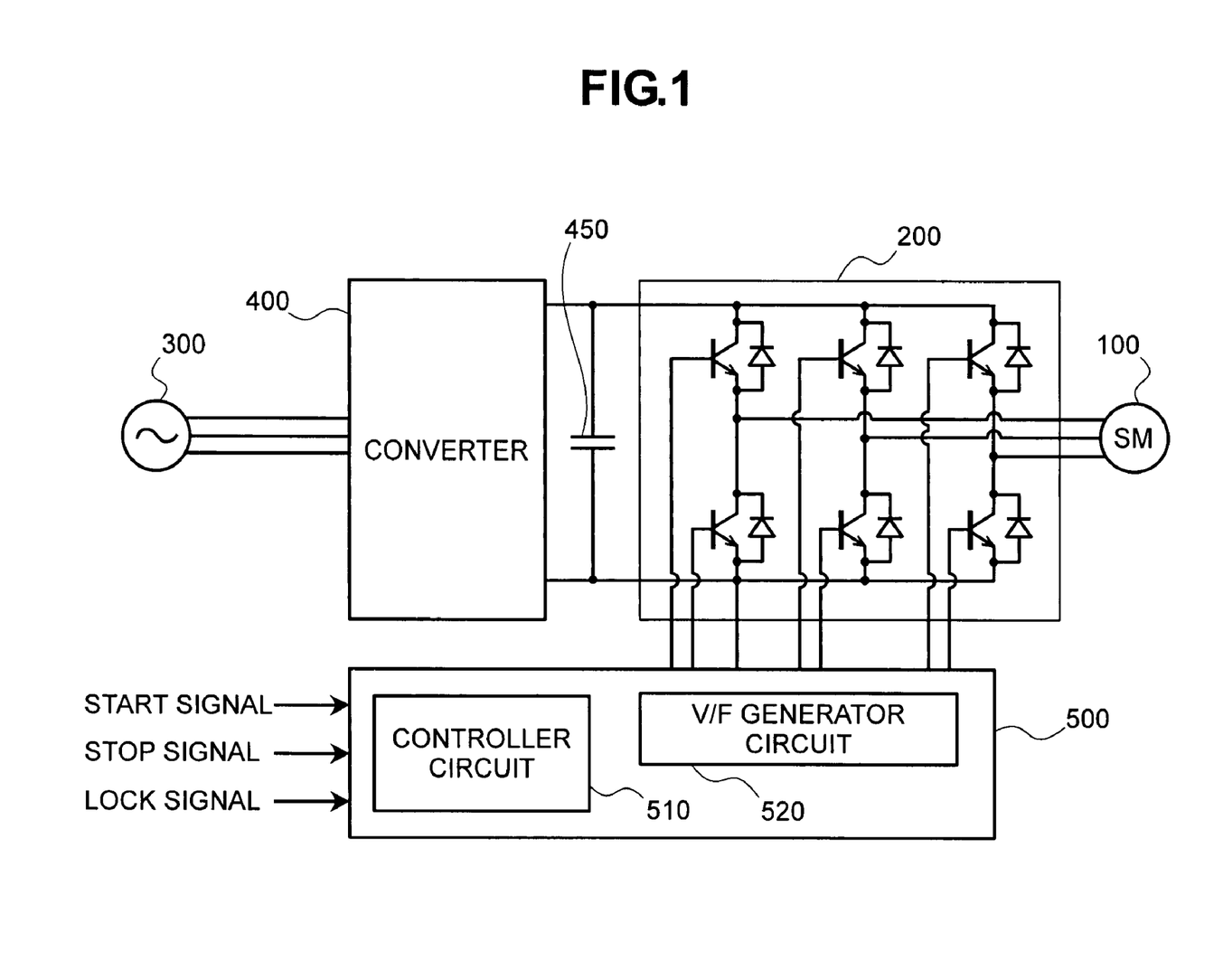
FIG. 1 is a block diagram for showing the controller apparatus, for conducting a control of driving/controlling a three-phases AC synchronous motor, according to an embodiment of the present invention.

Next, in FIG. 1 attached herewith is shown the structure of the controller apparatus, for driving/controlling the three-phases synchronous motor 100, the detailed structures of which are mentioned in the above. In this FIG. 1, the three-phases synchronous motor 100 has windings (or coils) of U-phase, V-phase and W-phase (see FIGS. 9(a) and 9(b)), and those are connected to AC output terminals of a voltage-type inverter, which is indicated by a reference numeral 200 in the figure, respectively. This voltage-type inverter 200, as is shown in the figure, comprises three (3) sets of inverse-parallel connection circuits in the bridge connection, each set of which has a transistor, as being the self-erasable switching element, and a diode; thereby, building up so-called, a PWM (Pulse Width Modulation) circuit, for supplying three-phase AC powers, at a predetermined frequency and of a predetermined voltage.

On the other hand, a reference numeral 300 in the figure depicts a commercial three-phase AC power source, and the voltage thereof is rectified through a converter 400, being constructed with the bridge circuit of diodes, for example, and further is smoothened by means of a smoothing capacitor 450, thereby to be connected to input terminals of the voltage-type inverter 200. Then, each of the switching elements (i.e., the transistors) of the voltage-type inverter 200 is controlled to be ON/OFF, in the condition thereof, respectively, through control signals provided from an inverter control portion 500, which will be explained hereinafter; therefore, the voltage-type inverter 200 supplies the electric powers to the U-phase, the V-phase and the W-phase of the three-phases synchronous motor 100, through AC output terminals thereof. Further, as is shown in the figure, this inverter control portion 500 inputs a start signal, a stop signal and a lock signal (i.e., a signal for fixing the position of the rotor within the electric motor), also inputting a speed instruction (SP) from an outside thereof, as well, though not shown in the figure, and it comprises a controller circuit 510 for performing a predetermined control, and a V/F generator circuit 520 for generating a V/F (Voltage/Frequency) characteristic curve, which will be explained later, etc. And, this inverter control portion 500 is built up with a microcomputer, for example.

In FIG. 2 is shown a characteristic curve, in accordance with a controlling method for controlling the voltage of power source to be kept at constant (i.e., the rated voltage), within a region being equal or higher than that so-called rated frequency ($f_o$), while bringing the V/F ratio (=φ) to be constant, within a region lower that that rated frequency ($f_o$), with an aid of the inverter control portion 500, the structures of which are explained in the above.

Herein, the synchronous motor, comprising the controller apparatus mentioned above therein, is driven under various conditions thereof, to be controlled, while inputting the start signal, the stop signal and the lock signal, in addition to the speed instruction (SP) mentioned above. The various kinds of operation conditions within the synchronous motor are shown in FIG. 5 attached herewith.

Thus, under a condition S1 of "UNDER STOPPING IN UN-LOCK CONDITION", for example, when the start signal mentioned above is inputted into the controller apparatus, then the synchronous motor shifts or moves into "START ON" condition, and after passing through the condition of S2 of "UNDER ACCELERATION" in the figure, it moves into the condition S3 "CONSTANT SPEED" where it rotates at a predetermined rotation speed. Thereafter, when the rotation speed comes to be zero "0" (i.e., "SEED 0" in the figure), the synchronous motor shifts into, depending upon presence of an input of the lock signal; i.e., the synchronous motor turns back to the condition S1 of "UNDER STOPPING IN UN-LOCK CONDITION" mentioned above, again, passing through the conditions, "LOCK OFF" and "LOCK ON" in the figure, or alternatively, it moves into a condition S5, "UNDER LOCKING", fixing the position of the rotor. At this instance, since the rotation speed is determined, directly, by the frequency signal (F) of the AC powers, which are supplied from the inverter control portion 500, in particular, in the three-phases synchronous motor 100, the detailed structure of which are mentioned in the above, then the inverter control portion 500 is so set up, that it makes up "SEED 0" at the time when that frequency signal (F) comes down to be a predetermined value (such as, 0.6 $min^{-1}$, for example). Or, alternatively, from the relationship of V/F ratio (=φ) constant, it is also possible to make the determination thereof upon basis of the voltage value (V), in the place of that frequency signal (F).

On the other hand, when the synchronous motor rotates at a preset rotation speed, again, shifting from the condition of "UNDER LOCKING", as is indicated by an arrow in the figure, it shifts into the condition S3 of "CONSTANT SPEED", after being shifted into the condition of S2 of "UNDER ACCELERATION" mentioned above, or after being shifted into the condition of "UNDER STOPPING IN UN-LOCK CONDITION", once, for releasing from the lock condition mentioned above, and then it shifts into the condition S3 of "CONSTANT SPEED" passing through the condition of S2 of "UNDER ACCELERATION" mentioned above; thereby being rotationally driven at the present rotation speed. Also, the synchronous motor is able to shift into, alternately, between the condition S1 of "UNDER STOPPING IN UN-LOCK CONDITION" and the condition S5 of "UNDER LOCKING".

Figure 3:
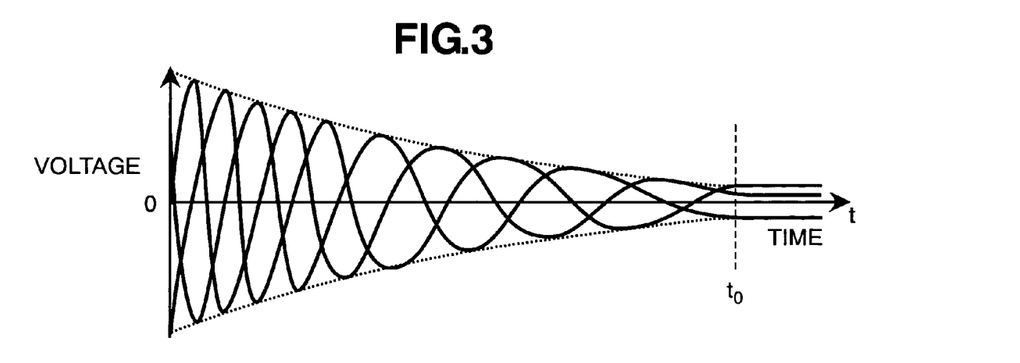
FIG. 3 is a graph for showing waveforms of voltages, which are supplied from an inverter to U-phase, V-phase and W-phase of the synchronous motor, within the controller apparatus according to the present invention.
Figure 5:
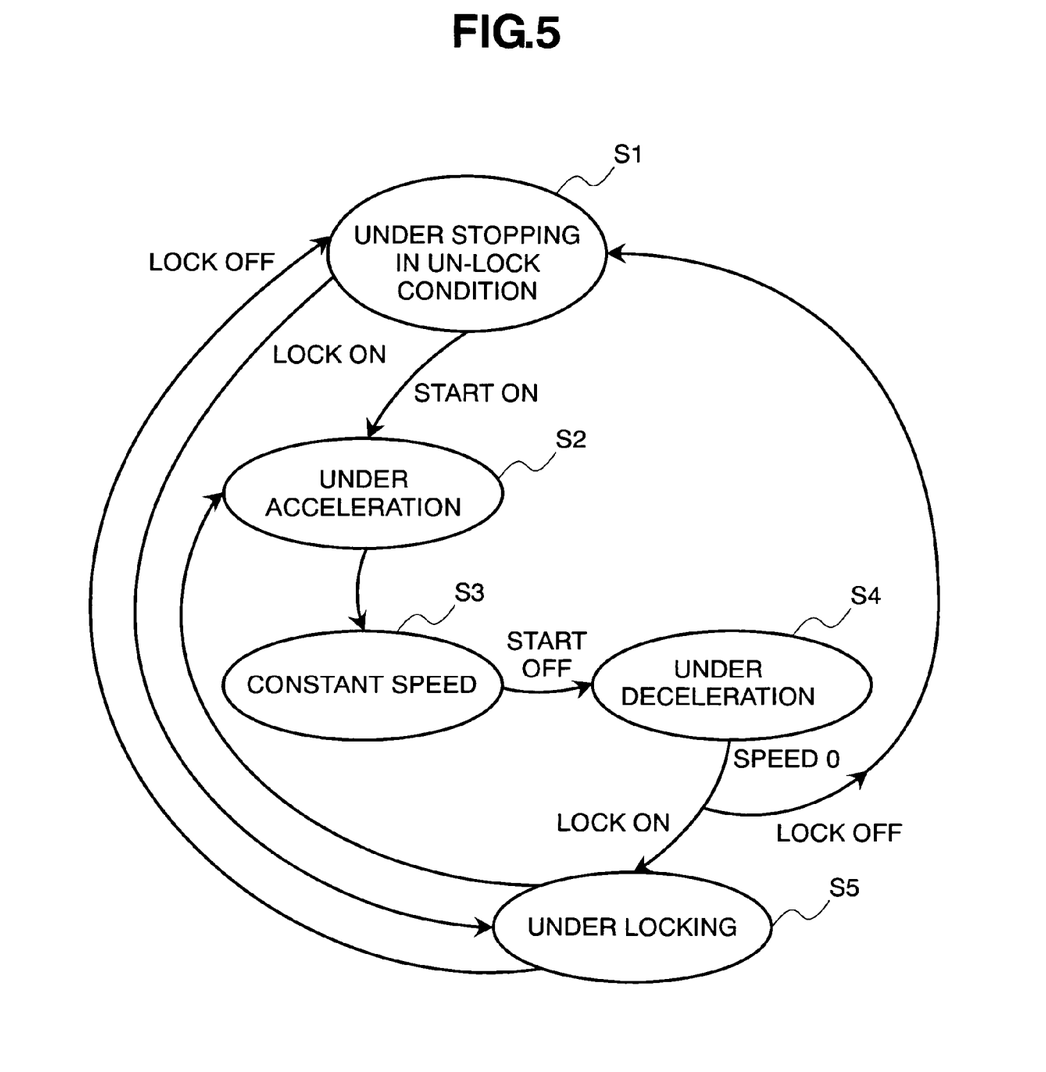
FIG. 5 is a view for transition of conditions of the synchronous motor, which is driven/controlled by the controller apparatus for the synchronous motor, according to the present invention.

Herein, in FIG. 3 attached herewith are shown the conditions of the electric powers, in more details thereof, voltage waveforms thereof, which are supplied from the inverter 200 to the U-phase, the V-phase and the W-phase of the synchronous motor 100, when the synchronous motor falls down to "0" in the rotation speed thereof, under a condition of S4 "UNDER DECELERATION" shown in FIG. 5 mentioned above. Thus, under the condition of S4

"UNDER DECELERATION", the AC voltages supplied from the inverter 200 are lowered down in the voltage (V), as well as, the frequency (F) thereof, in accordance with the predetermined relationship (i.e., the relationship of V/F ratio (=φ) constant, shown in FIG. 2 mentioned above). And, at the time when the frequency (F) or the voltage (V) thereof reaches to the predetermined value (see "$t_0$" in the figure), the AC voltages are changed into DC voltages, to be supplied thereto, each having a predetermined voltage value, for bringing the synchronous motor into the locked condition thereof. Thus, the AC voltages, having being supplied from the inverter 200 to the AC windings, i.e., the U-phase, the V-phase and the W-phase, which are wound around the poles of the stator of the synchronous motor 100, are changed into the DC voltages, and at the same time thereof, the DC voltages in the respective phases are set at a ratio, which is determined by the values of the AC voltages just before when the rotation speed of the rotor comes down to zero (0). However, the DC voltages supplied to those respective phases may be variable in the voltage values thereof, appropriately, within a predetermined region, as far as they follow or satisfy the ratio mentioned above.

In this manner, in case when supplying the electric power by changing it into the DC voltages, which have the predetermined voltage values, respectively, for the purpose of bringing the synchronous motor into the locked condition, through controlling the voltage-type inverter 200, which builds up the PWM circuit therein, as was mentioned above, it is possible to achieve the lock condition of the synchronous motor, with extremely simple construction and with easiness. Thus, as is apparent from the structures of the three-phases synchronous motor 100, the details of which were shown in FIGS. 6 to 9(*b*) mentioned above, since the magnetic fields generated in the tooth portions 24, 24 . . . , being formed on an inner periphery of the magnetic poles (or, the stator poles) 22, 22 . . . , by twelve (12) pieces thereof in total, are fixed (i.e., not rotate), then the rotor 30, having plural numbers of the grooves 31, 31 . . . formed on the outer periphery thereof, opposing to those, is absorbed onto the magnetic fields generated on the stator 20, thereby to be locked; therefore, there is no such necessity of providing the electromotive lock mechanism, including the brake shoe, etc., as is in the prior art.

Also, within the controller apparatus or the controlling method mentioned above, according to the present invention, detection of the rotation speed can be achieved very easily, for example, with using the frequency (F) or the voltage (V), which is generated within the inverter control portion 500, for controlling the inverter 200 of building up the controller apparatus.

Further, the predetermined voltage values of the DC voltages may be variable, through setting up parameters, appropriately, within the inverter control portion 500, which is built up with the microcomputer or the like, as is shown in FIG. 1 mentioned above. And also, with the values thereof, it is preferable to be determined at the voltage value, but in such a degree that current does not flows into the windings exceeding over the rated current thereof, even if being supplied under the condition where the synchronous motor is stopped, by taking generation of burnout, etc., into the consideration thereof, when supplying it into the AC windings mentioned above, for example. In more details thereof, it is preferable to determine the voltage value to be about 30% of the rated voltage (i.e., a peak value of the voltage at frequency equal or higher than the rated frequency "$f_0$"), or to be lower than that.

Figure 4A:
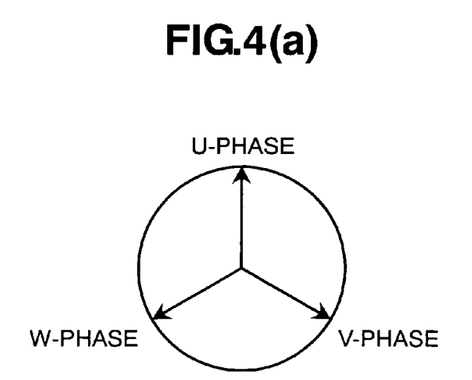
FIGS. 4(a) and 4(b) are views for showing another example of the waveforms of voltages, which are supplied from an inverter to the synchronous motor, within the controller apparatus according to the present invention.
Figure 4B:
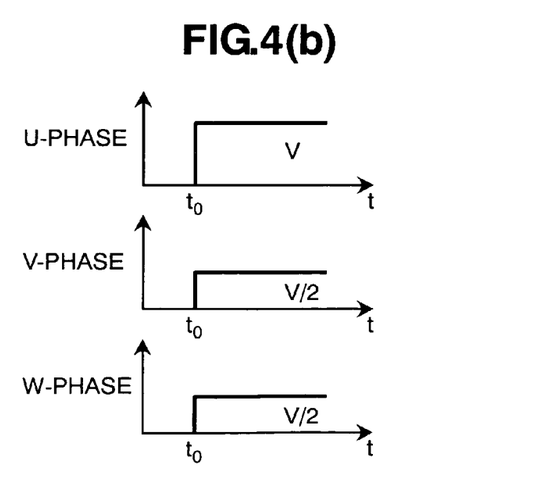

Or, alternatively, in the place of that mentioned above, at the time when the rotation speed of the synchronous motor comes down to zero "0", it is also possible to maintain the voltages supplied from the inverter 200 to the U-phase, the V-phase and the W-phase of the synchronous motor 100, to be as they are at that time. Or, in the place thereof, for example, as is shown in FIG. 4 attached herewith, it is also possible to supply the DC voltages of a predetermined pattern, which are determined in advance, to the U-phase, the V-phase and the W-phase, at the time "$t_0$" when the rotation speed of the synchronous motor comes down to zero "0". However, the example shown in this FIG. 4 is a case, wherein voltage of "V" is supplied to the U-phase while voltages of "V/2" to the V-phase and the W-phase, but assuming that an about 30% of the rated voltage mentioned above to be "V", for example.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A controller apparatus for a synchronous motor, which has a stator wound with AC windings, a rotor installed within an inside of said stator, rotatably, and a lock function for holding a rotating position of said rotor with respect to said stator, therein, comprising:

an inverter for supplying AC voltages having a predetermined voltage/frequency characteristic to the AC windings, which are wound around poles of the stator of said synchronous motor; and a controller portion for controlling said inverter, so that the AC voltages, being supplied from said inverter to the AC windings wound around the poles of the stator of said synchronous motor, is changed into DC voltages to be supplied thereto, when rotation of said rotor is zero (0) and also when a lock function signal is ON in condition thereof, wherein the DC voltages to be supplied from said inverter to the AC windings wound around the poles of the stator of said synchronous motor, when rotation of said rotor is zero (0) and also when the lock function signal is ON in condition thereof, are determined at a value so that current flowing through said AC winding therewith comes to be equal or less than a rated current thereof.

2. The controller apparatus for a synchronous motor, described in the claim 1, wherein the DC voltages to be supplied from said inverter to the AC windings wound around the poles of the stator of said synchronous motor, is determined to be about 30% of a peak value of AC voltages under steady condition of said synchronous motor, or lower than that.

3. A controller apparatus for a synchronous motor, which has a stator wound with AC windings, a rotor installed within an inside of said stator, rotatably, and a lock function for holding a rotating position of said rotor with respect to said stator, therein, comprising:

an inverter for supplying AC voltages having a predetermined voltage/freguency characteristic to the AC windings, which are wound around poles of the stator of said synchronous motor; and a controller portion for controlling said inverter, so that the AC voltages, being supplied from said inverter to the AC windings wound around the poles of the stator of said synchronous motor, is changed into DC voltages to be supplied thereto, when rotation of said rotor is zero (0) and also when a lock function signal is ON in condition thereof, wherein the DC voltages to be supplied from said inverter to the AC windings wound around the poles of the stator of said synchronous motor, when rotation of said rotor is zero (0) and also when the lock function signal is ON in condition thereof, are kept in a patter of variable DC voltages, at a ratio of voltage values on the respective phases, being determined by the respective phases of the AC voltages just before when the rotation of said rotor comes down to be zero (0).

4. A controlling method for a synchronous motor, which has a stator wound with AC windings, a rotor installed within an inside of said stator, rotatably, and a lock function for holding a rotating position of said rotor with respect to said stator, therein, comprising the following steps of:

supplying AC voltages having a predetermined voltage/freguency characteristic to the AC windings, which are wound around poles of the stator of said synchronous motor, by means of an inverter; and controlling said inverter, so that the AC voltages, being supplied from said inverter to the AC windings wound around the poles of the stator of said synchronous motor, is changed into DC voltages to be supplied thereto, when rotation of said rotor is zero (0) and also when a lock function signal is ON in condition thereof, wherein the DC voltages to be supplied from said inverter to the AC windings wound around the poles of the stator of said synchronous motor, when rotation of said rotor is zero (0) and also when the lock function signal is ON in condition thereof, are determined at a value so that current flowing through said AC winding therewith comes to be equal or less than a rated current thereof.

5. The controlling method for a synchronous motor, described in the claim 4, wherein the DC voltages to be supplied from said inverter to the AC windings wound around the poles of the stator of said synchronous motor, is determined to be about 30% of a peak value of AC voltages under steady condition of said synchronous motor, or lower than that.

6. A controlling method for a synchronous motor, which has a stator wound with AC windings, a rotor installed within an inside of said stator, rotatably, and a lock function for holding a rotating position of said rotor with respect to said stator, therein, comprising the following steps of:

supplying AC voltages having a predetermined voltage/frequency characteristic to the AC windings, which are wound around poles of the stator of said synchronous motor, by means of an inverter; and controlling said inverter, so that the AC voltages, being supplied from said inverter to the AC windings wound around the poles of the stator of said synchronous motor, is changed into DC voltages to be supplied thereto, when rotation of said rotor is zero (0) and also when a lock function signal is ON in condition thereof, wherein the DC voltages to be supplied from said inverter to the AC windings wound around the poles of the stator of said synchronous motor, when rotation of said rotor is zero (0) and also when the lock function signal is ON in condition thereof, are kept in a patter of variable DC voltages, at a ratio of voltage values on the respective phases, being determined by the respective phases of the AC voltages just before when the rotation of said rotor comes down to be zero (0).

* * * * *